United States Patent [19]
Baron et al.

[11] Patent Number: 5,398,521
[45] Date of Patent: Mar. 21, 1995

[54] COMMERCIAL FREEZER

[76] Inventors: David L. Baron, 2150 Paloma St., Pasadena, Calif. 91104; Jonathan D. Martin, 9131 Ramona St., Bellflower, Calif. 90706

[21] Appl. No.: 131,431

[22] Filed: Oct. 4, 1993

Related U.S. Application Data

[63] Continuation of Ser. No. 758,774, Sep. 12, 1991, abandoned.

[51] Int. Cl.⁶ ............................................. F25D 25/02
[52] U.S. Cl. .................................... 62/381; 62/419
[58] Field of Search ..................... 62/381, 404, 419

[56] References Cited

U.S. PATENT DOCUMENTS

| | | | |
|---|---|---|---|
| 2,791,889 | 5/1957 | Childers | 62/102 |
| 3,269,142 | 8/1966 | De Mola et al. | 62/381 |
| 3,348,659 | 11/1967 | Roinestad | 198/136 |
| 3,391,548 | 7/1968 | Gram | 62/381 |
| 3,938,651 | 2/1976 | Alfred et al. | 198/136 |
| 4,023,376 | 5/1977 | Onodera | 62/63 |
| 4,023,381 | 5/1977 | Onodera | 62/381 |
| 4,056,950 | 11/1977 | Kaufman, Jr. | 62/381 |
| 4,078,394 | 3/1978 | Chamberlain et al. | 62/203 |
| 4,078,655 | 3/1978 | Roinestad | 198/848 |
| 4,103,768 | 8/1978 | Persson | 198/778 |
| 4,177,647 | 12/1979 | Overbye | 62/63 |
| 4,612,780 | 9/1986 | Briley et al. | 62/381 |
| 4,798,062 | 1/1989 | Lipinski et al. | 62/381 |
| 4,953,365 | 9/1990 | Lang et al. | 62/381 |

FOREIGN PATENT DOCUMENTS 528125 7/1955 Italy .

Primary Examiner—John C. Fox
Attorney, Agent, or Firm—Lewis Anten

[57] ABSTRACT

A refrigerator having coaxial, but oppositely directed, fans pulls air over refrigeration coils and perpendicularly across articles to be refrigerated supported by an endless conveyor belt. The endless conveyor belt is supported and impelled by a carousel that turns on a stationary frame.

9 Claims, 10 Drawing Sheets

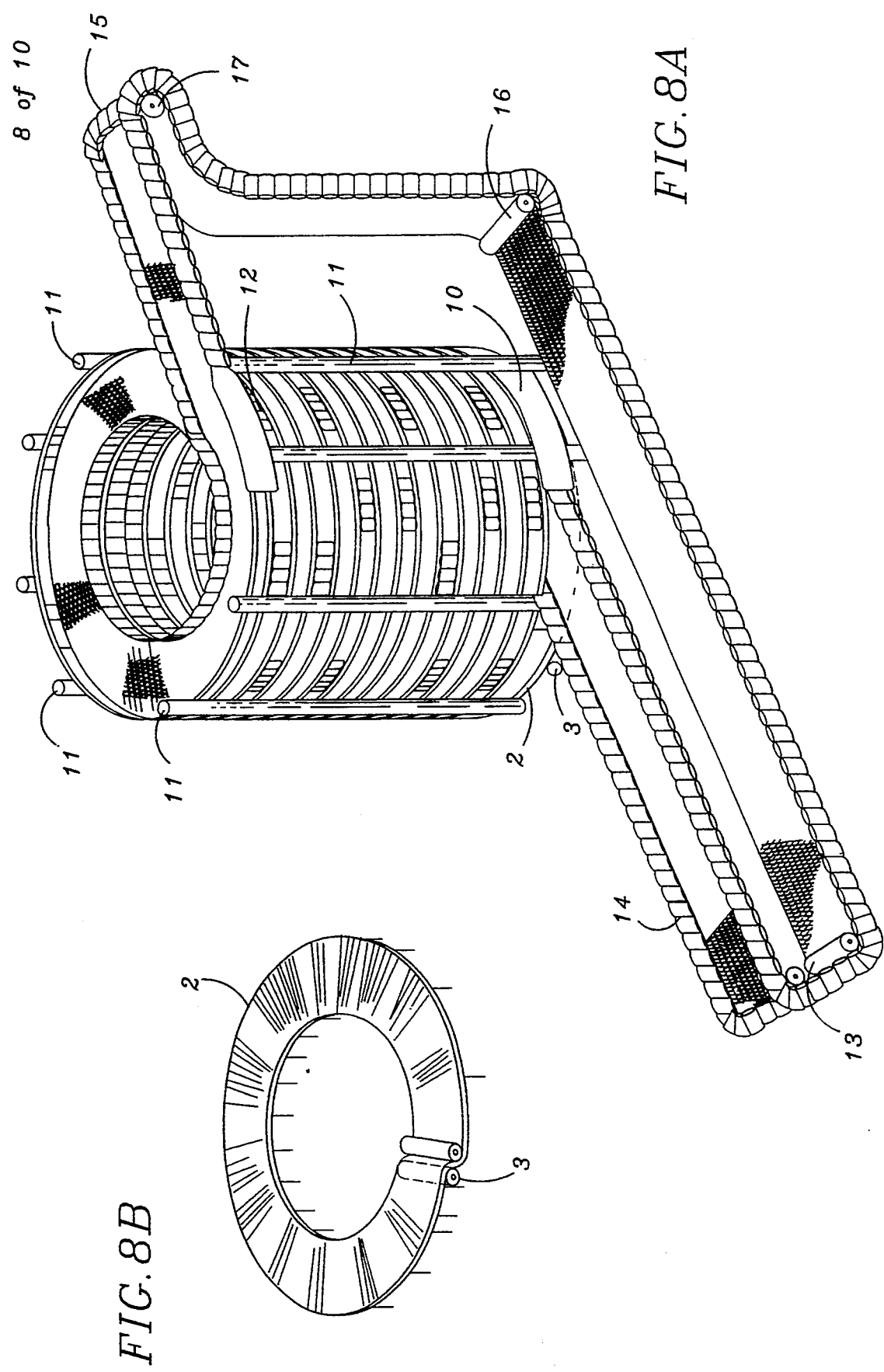

COMMERCIAL FREEZER

This application is a continuation of application Ser. No. 07/758,774, filed on Sep. 12, 1991, now abandoned.

BACKGROUND OF THE INVENTION

A. Field of the Invention

The present invention relates to a commercial apparatus for fast freezing food products, and more specifically to commercial freezers using interior helical conveyors. The present apparatus consists of room having a helical belt upon which the food is placed and which has chilled air drawn horizontally across the food in a uniform manner.

B. Description of the Related Art

Refrigeration of food products in order to preserve them has been artificially accomplished for a number of years. An Information Disclosure Statement has been submitted conforming to 37 C.F.R. §§ 1.97 and 1.98. Of the art disclosed therein, the following three U.S. patents are considered to be relevant: U.S. Pat. No. 3,391,548 issued to Gram on Jul 9, 1968; U.S. Pat. No. 4,103,768 issued to Persson on Aug. 1, 1978; and U.S. Pat. No. 4,798,062 issued to Lipinski et al. on Jan. 17, 1989.

The Gram patent discloses a helical refrigeration apparatus in conjunction with a means for moving articles through the refrigerated area. The Gram patent does not disclose a refrigeration apparatus in and of itself.

The Persson patent discloses a helically curved conveyor for use in an enclosure that may refrigerate articles. Persson has treating machinery within an area surrounded by the conveyor, with simple means for circulating air.

The Lipinski et al. patent discloses a portable food freezer, with the path of the air blown by the fan inside the freezer is not optimized and allows some articles to be cooled with air previously heated by other articles.

The related art is believed not to disclose means by which articles travelling within a freezer may be uniformly cooled in the manner disclosed herein. In freezers, air used for cooling is used to cool several articles before being again refrigerated by cooling coils or the like. For a given volume of air, the first article cooled by the refrigerated air enjoys the lowest temperature. Heat given off by the first article is absorbed by the passing air, warming the air. Articles succeeding the first article cooled have air passed over them that has been warmed by an earlier article. As a result articles cooled later by that same air are not cooled to the same degree as the first article.

When all articles to be cooled are subjected to the same cold temperature, the articles may be cooled more uniformly. Quick and uniform cooling enhances refrigeration and better preserves those articles being refrigerated. At the same time, it improves the freezing efficiency of the unit, and reduces the level of product dehydration associated with mechanical spiral freezers.

Quick cooling can be achieved by circulating air across the tops of articles to be cooled. The flow of air across the tops of articles to be cooled is in contrast with most helical refrigerators that move air generally across the sides of articles to be cooled in a vertical direction.

SUMMARY OF THE INVENTION

Applicants' invention addresses the rapid chilling or freezing of items, especially food items, on an industrial scale and in an ongoing and continuous basis. Due to the established nature of refrigeration as a means for preserving food or other items, the related art is also well-established and widespread.

An insulated chamber is provided that encompasses a helical conveyor belt assembly. The insulated chamber has an inlet and an outlet for the introduction and removal of articles from the chamber. The helical conveyor assembly allows efficient use of the enclosed space for cooling while carrying the articles.

By means of using dual, high velocity coaxial fans facing opposite directions at opposite ends of a helical conveyor system within the closed chamber, refrigerated air cooled by refrigeration coils within the helical conveyor flows across the tops of the articles to be cooled or frozen. This air flow is generally perpendicular to the direction of motion of the helical conveyor.

Air movement over refrigeration coils inside the helical conveyor is achieved by the high velocity fans that evacuate air from the center of the spiral defined by the helical conveyor and direct it out over the top and under the bottom of the helical conveyor. The low pressure zone in the center of the unit causes air to be pulled over the product, across the belt and over the refrigerated coils where the air is cooled. Once in the center of the spiral, the air is again evacuated from the center, out the top and bottom, to continue the cycle.

The helical conveyor is connected to itself in a continuous fashion and moves within the insulated walls around a refrigeration unit. In the preferred embodiment, the helical conveyor is supported within the refrigerated chamber by means of a rotating support carousel structure. The carousel is driven by a motor and conducts the conveyor in a spiral fashion around the refrigeration unit several times. For a conveyor received by the carousel at its base, with each turn of the carousel, a specific portion of the conveyor on the carousel travels upwardly a certain distance until it reaches the top of the carousel. The conveyor is then routed to the outlet for article removal and subsequently returns to the inlet for article introduction.

Several tiers of rotating conveyor belt may be carried by the carousel in this manner as conveyor travels in both a circular and upward manner. This increases the allowable surface area for the conveyor and permits greater cooling for more articles.

The air is then circulated in a toroidal manner by each fan. Air is prevented from immediately flowing back to the low pressure area by means of baffles associated with the fans at the top and bottom of the carousel.

BRIEF DESCRIPTION OF THE DRAWINGS

FIG. 8A shows a perspective view of a prior art self-supporting conveyor as may be used in conjunction with the present invention.

FIG. 8B shows a perspective view of a segment of the conveyor of FIG. 8A.

OBJECTS OF THE INVENTION

It is an object of the present invention to provide means by which articles may be refrigerated in an efficient manner.

It is also an object of this invention to provide means by which articles may be quickly refrigerated.

It is another object of this invention to provide means by which articles may be uniformly refrigerated.

These and other objects and advantages of the present invention will be apparent from a review of the following specification and accompanying drawings.

DETAILED DESCRIPTION OF DRAWINGS

Figure 1:
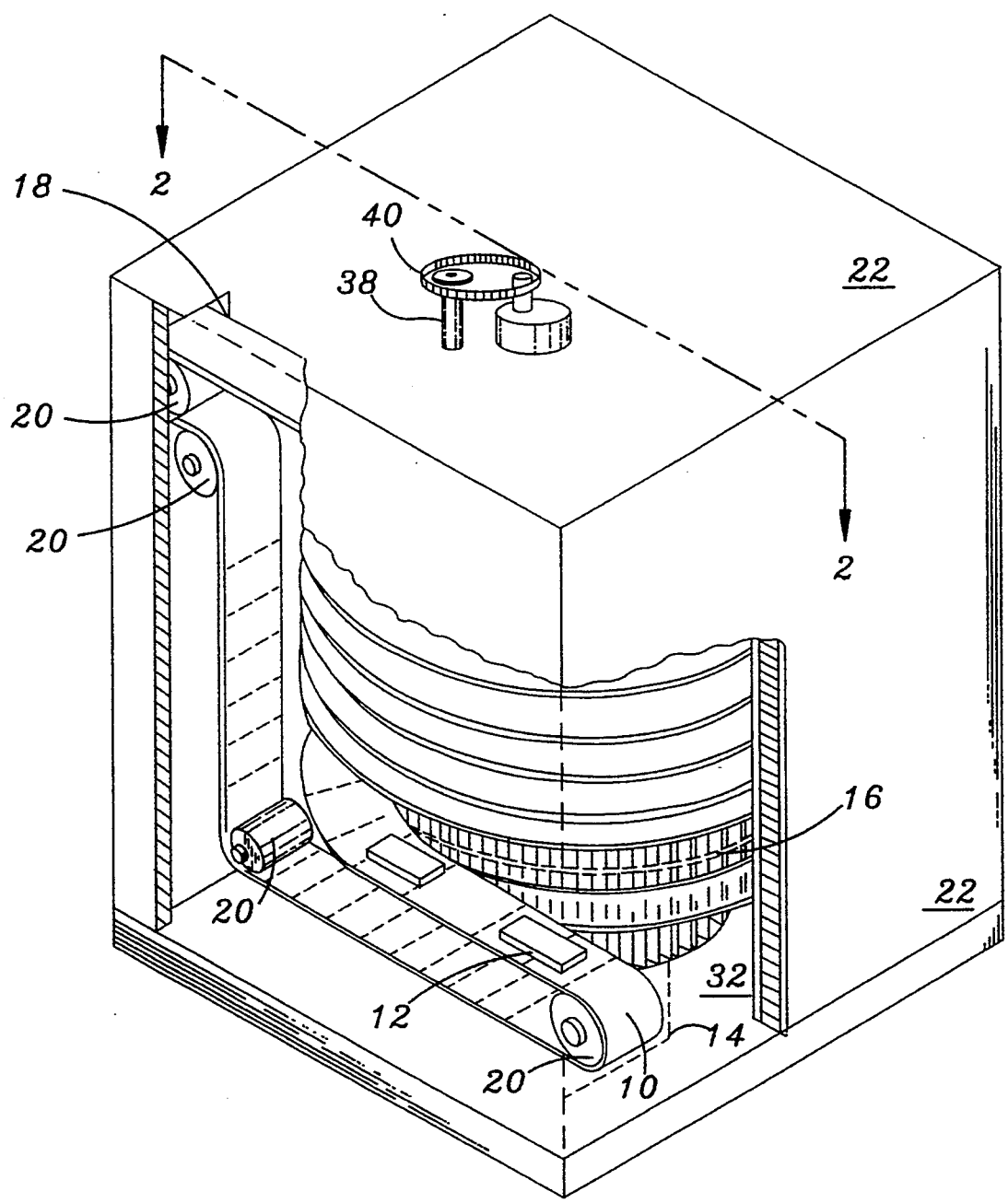
FIG. 1 shows a perspective view of the present invention and a section thereof.

Referring to the accompanying drawings, FIG. 1 shows a sectional perspective view of the preferred embodiment of the present invention. An endless conveyor belt 10 carries articles 12 from an inlet opening 14 where incoming articles 12 may be placed on the conveyor 10. The conveyor 10 travels around a carousel 16 that supports and impels the conveyor 10 in an upwardly helical manner. Outgoing articles 12 upon the conveyor 10 are delivered by the conveyor 10 to an outlet opening 18. Upon delivering the article 12, the conveyor 10 returns to the inlet opening 14. Rollers 20 are present that guide the conveyor 10 when it is not supported by the carousel 16.

The conveyor 10, rollers 20, and carousel 16 are surrounded by insulated walls 22, including the floor and ceiling. The insulated walls 22 thermally isolate the defined interior 32 from its surroundings so that a hot or cold environment can be maintained within.

Figure 2:
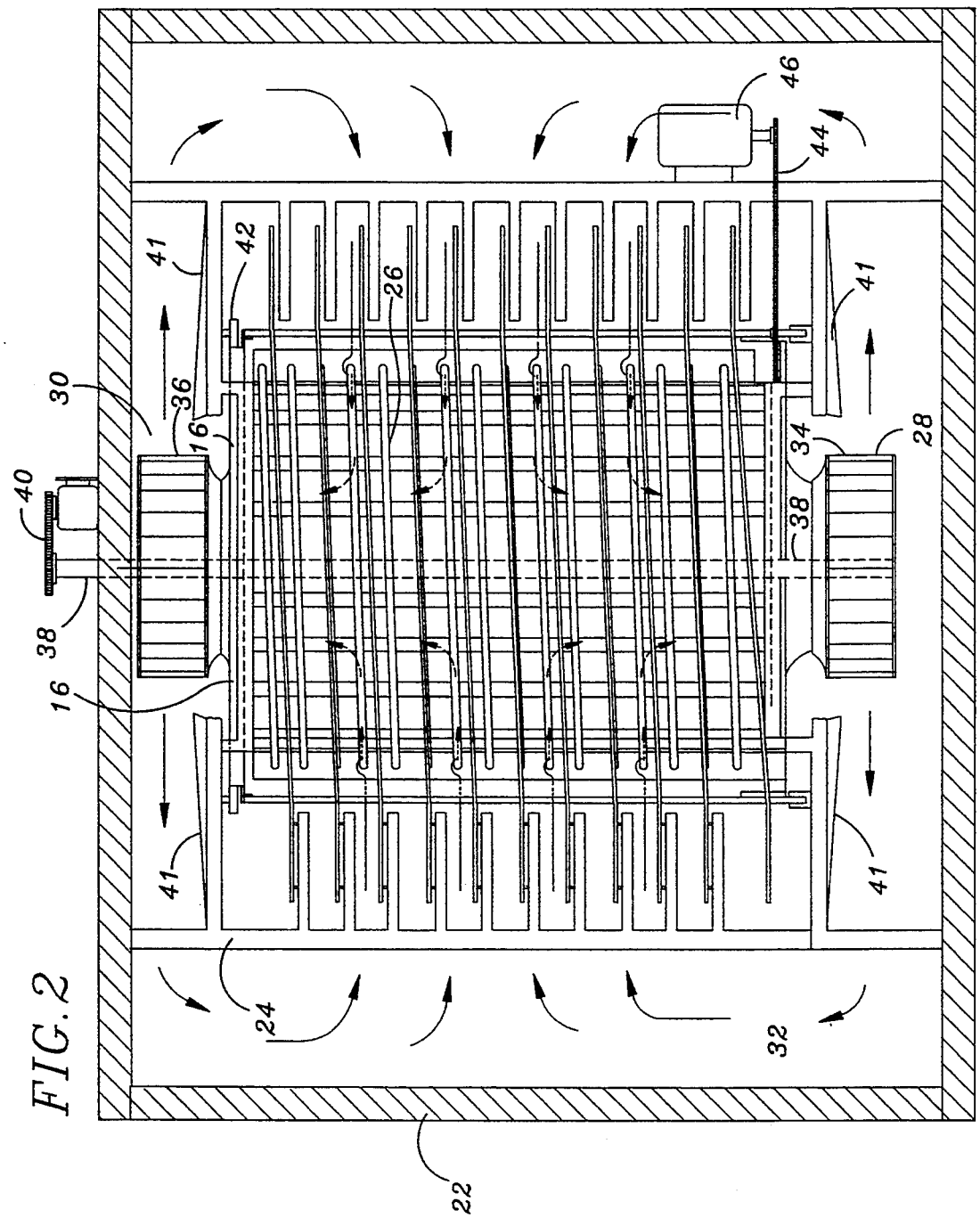
FIG. 2 shows a cross section view of the present invention as taken through line 2—2 of FIG. 1.
Figure 3:
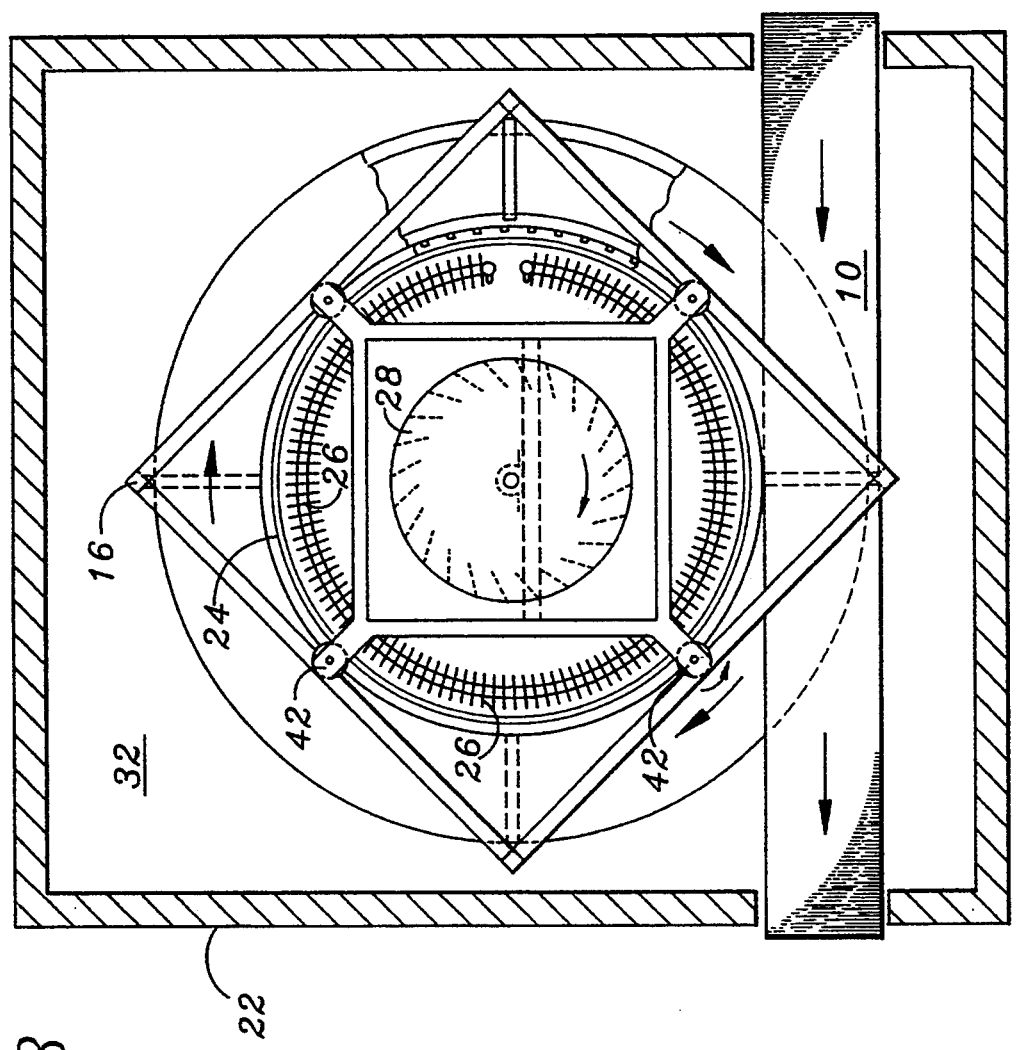
FIG. 3 shows a top sectional view of the present invention.
Figure 4:
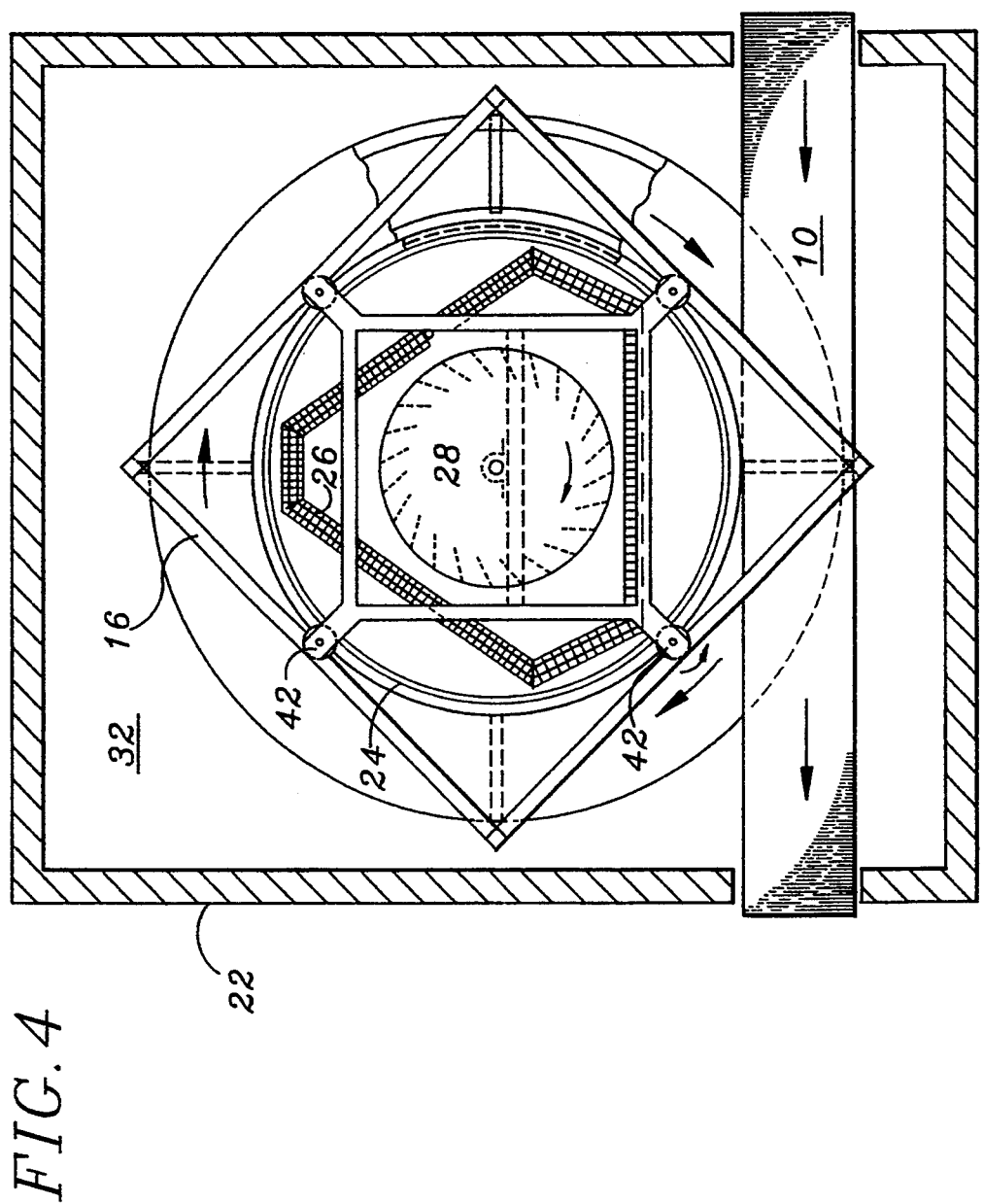
FIG. 4 shows a top sectional view of the present invention with a triangular refrigeration coil structure.
Figure 5:
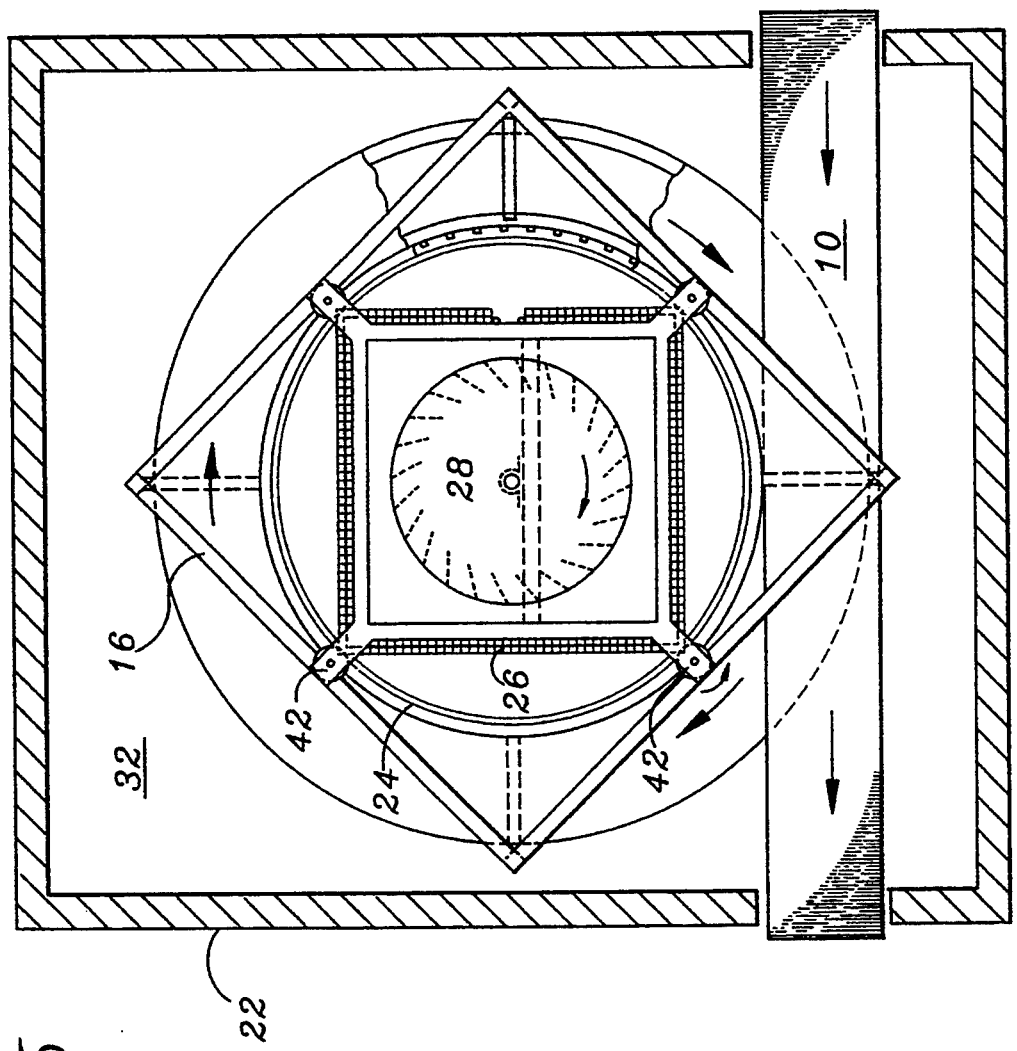
FIG. 5 shows a top sectional view of the present invention with a square refrigeration coil structure.
Figure 6:
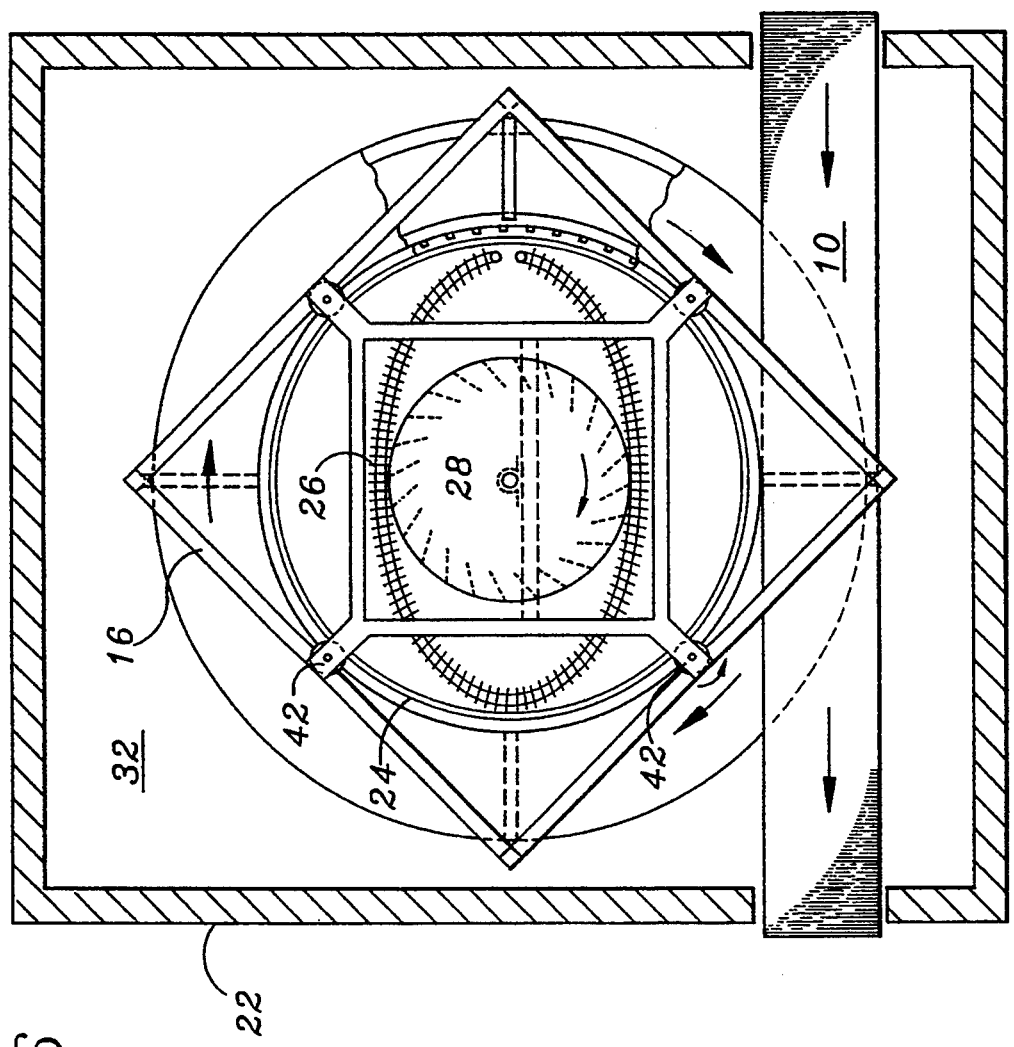
FIG. 6 shows a top sectional view of the present invention with an oval refrigeration coil structure.
Figure 7:
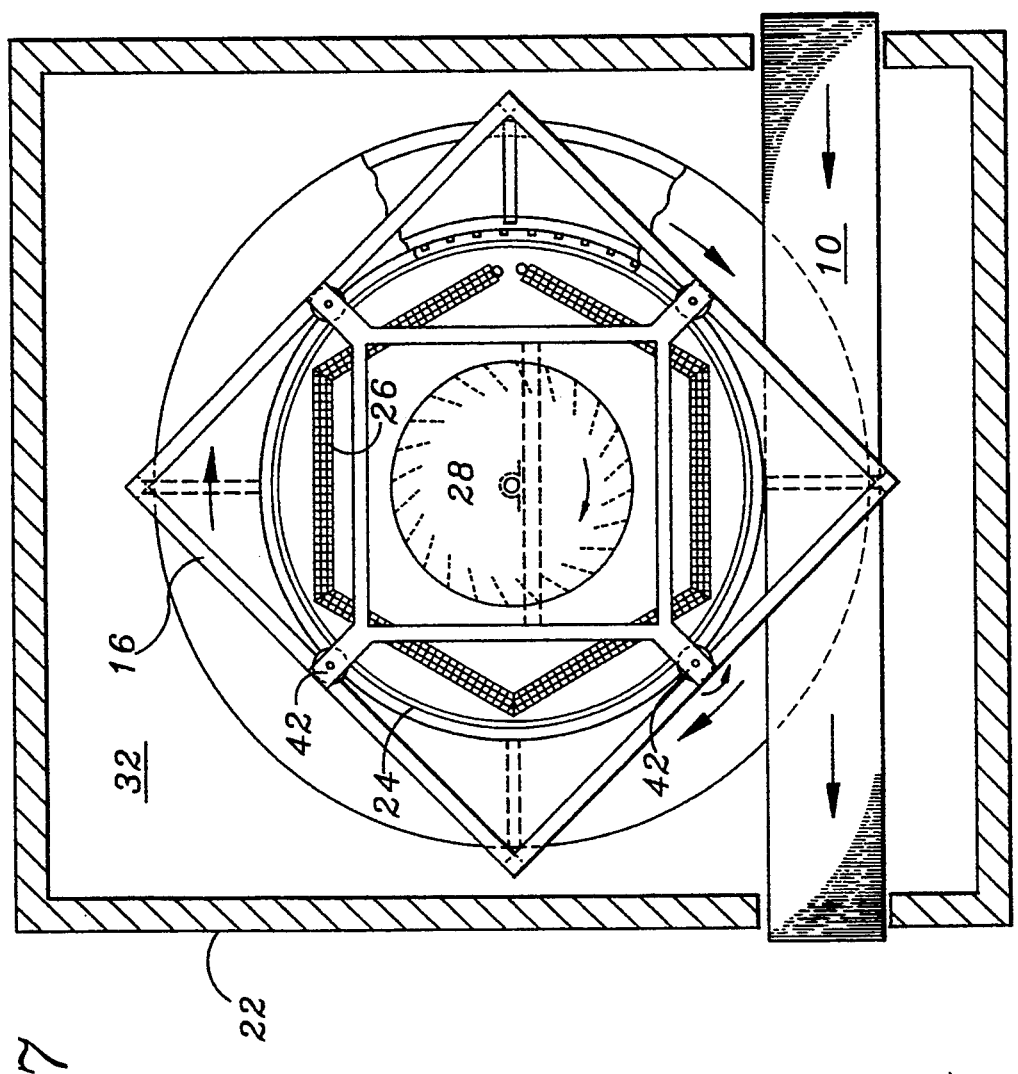
FIG. 7 shows a top sectional view of the present invention with a hexagonal refrigeration coil structure.

In FIG. 2, the internal features of the present invention are shown. Within the insulating walls 22, a frame 24 supports refrigeration coils 26 and two high-speed fans 28, 30. The refrigeration coils 26 are centrally placed between the two fans and are coaxial with the fans. The entire refrigeration unit (not shown) to which the coils 26 are attached may be placed outside the refrigerated enclosure 32. One of the fans 28 is placed near the floor. The other fan 30, is placed near the ceiling of the refrigerator interior 32. Space is present between the fans 28, 30 and the interior surfaces of the commercial refrigerator. The fans 28, 30 face and propel air in opposite directions, away from the central interior of the refrigerated enclosure 32, creating a consistently low pressure area within such space. Covers 34, 36 are present over the fans 28, 30 having vents or openings that force the air in a sidewise manner. A common drive shaft 38 turns both fans 28, 30 at a high rate of speed. The drive shaft 38 is impelled by motor-driven belt 40 located outside of the refrigerated enclosure 32.

Baffles 41 are present on the frame side of both fans 28, 30. These baffles 41 force the air propelled by the fans 28, 30 towards the outside of the enclosure 32 so that the air does not return to the low pressure area created by the fans 28, 30 by quickly going down the sides of the fans 28, 30.

The carousel 16 upon which the conveyor 10 rides is supported by the frame 24, but moves in a circular manner independent of the frame 24, which remains stationary. Rollers 42 are present and attached to the frame 24 that allow the carousel 16 to turn upon the frame 24 while allowing the carousel 16 to remain supported by the frame 24.

The carousel 16 is impelled by a motor-driven belt 44, the motor 46 remaining within the interior of the refrigerated enclosure 32 to provide access to the carousel 16. Other means by which the carousel 16 may be driven may be used, such as a bevel gear and drive shaft arrangement, allowing the motor 46 (and its accompanying heat) to be removed from the refrigerated enclosure 32 to its exterior. The speed of the motor 46 may be variable to allow for different exposure times of conveyed articles 12 to the cold environment of the refrigerated enclosure 32.

As the carousel 16 turns, it picks up and moves the conveyor belt 10 in an upwardly helical manner around the frame 24 and its refrigeration coils 26. The helical path of the conveyor belt 10 allows the belt 10 to be of great length in a small space and allows greater exposure time for the articles in the refrigerated environment of the enclosure 32.

The high-speed fans 28, 30 establish air flow patterns that subject all articles 12 present on the conveyor belt 10 to the same temperature. Many industrial refrigeration systems subject articles to differing temperatures as air that chills later articles has been warmed by the chilling of earlier articles. The present invention discloses means by which articles 12 may be chilled uniformly as the articles 12 on only one section of conveyor belt 10 are chilled by a certain volume of air before that volume of air is again chilled by the refrigeration coils 26.

As the fans 28, 30 pull the air in opposite directions, a region of continuously low pressure is present between the fans 28, 30, and inside the partial enclosure defined by the coils 26 of the refrigeration unit. Complementing this region of low pressure are regions of higher pressure created by the fans 28, 30, and just outside of them, as they blow the air about the enclosed chamber 32. The low pressure region pulls refrigerated air over the articles 12 on the conveyor belt 10, thereby chilling the articles 12. The air then continues its course towards the low pressure area by travelling over the refrigeration coils 26 where the air is once again chilled. Upon reaching the low pressure region, the air is pulled toward one of the two opposite ends of the frame by the fans 28, 30. The air is then forced to the edges of the carousel 16 by baffles 41 present on the frame-side of each fan 28, 30. The baffles 41 prevent the air from returning to the core area of the refrigerated enclosure 32, where the low pressure region is maintained, by travelling down the sides of the fans 28, 30 without chilling the conveyed articles 12.

The air then travels along the top and bottom of the refrigerated enclosure 32 as shownby the arrows of FIG. 2. Upon reaching the perimeter of the carousel 16, the edge of the baffle is reached and the air is allowed to travel towards the center of the refrigerated enclosure 32. The air is then pulled over the conveyor belt 10 and its articles 12 in a direction generally perpendicular to the conveyor's direction of travel. The air is then also pulled over the refrigeration coils 26 by the low pressure area. An ongoing cycle is established and this cycle forces the air to travel in two generally toroidal paths, one in the upper region and one in the lower region of the refrigerated enclosure 32.

This cycle is ongoing for as long as the refrigerator of the present invention is in operation.

The rapid well-distributed air movement ensures that heat is transferred by convection in a very efficient manner, making the most of the available fan horsepower and available chilling from the refrigeration coils 26. This rapid well-distributed airflow causes the boundary layer of air associated with a product to be continuously removed thus creating maximum wing chill effect.

Any number of refrigeration coil configurations may be used within the frame 24. The greater the surface area of the refrigeration coil structure, the more heat can be transferred from the air to the refrigeration coils 26, when the air passes over them. FIG. 3–7 respectively show top views of refrigerators of the present invention with circular, triangular, square, oval, and hexagonal refrigeration coil configurations.

Referring now to FIG. 8A and 8B, in addition to the several coil configurations that may be used in the present invention, a self-supporting conveyor 50 may also be used. Such a self-supporting conveyor 50 would not require a carousel 16, or a frame 24 to support the carousel 16. A frame 24 would still be required to support the refrigeration coils 26.

Figure 9A:
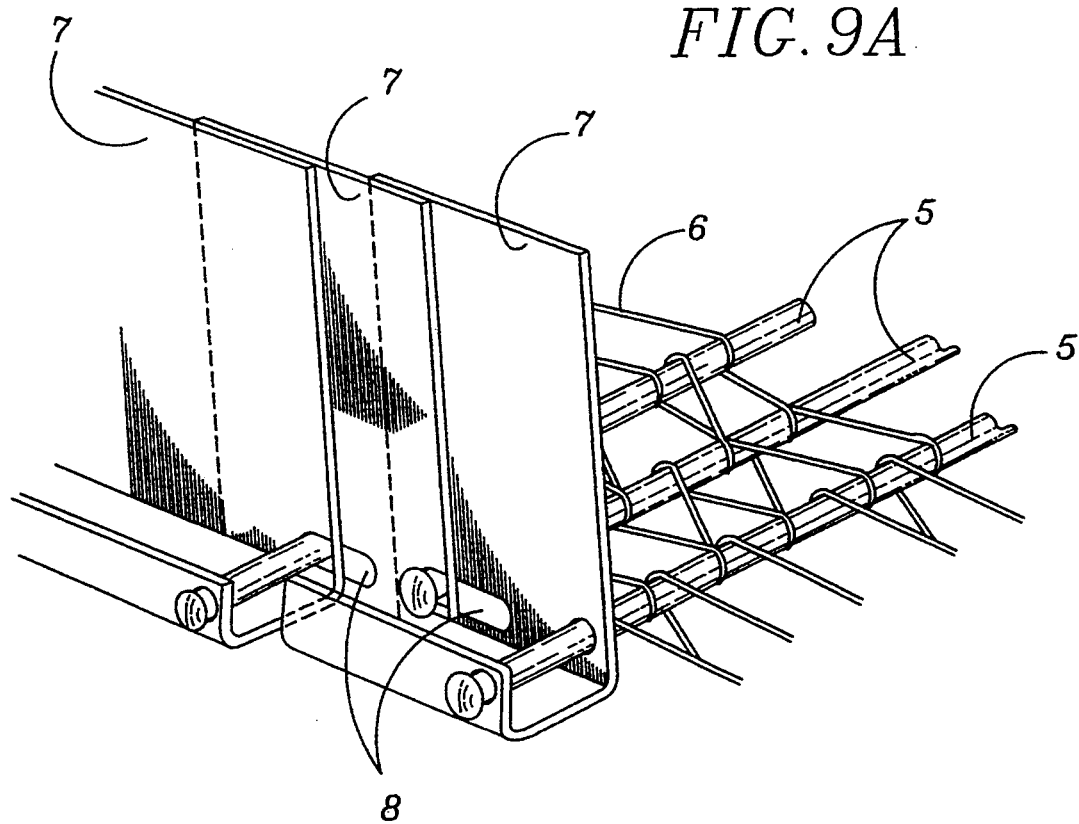
FIG. 9A and 9B show perspective views of a prior art foramenous side link that may be used with the self-supporting conveyor of FIG. 8.
Figure 9B:
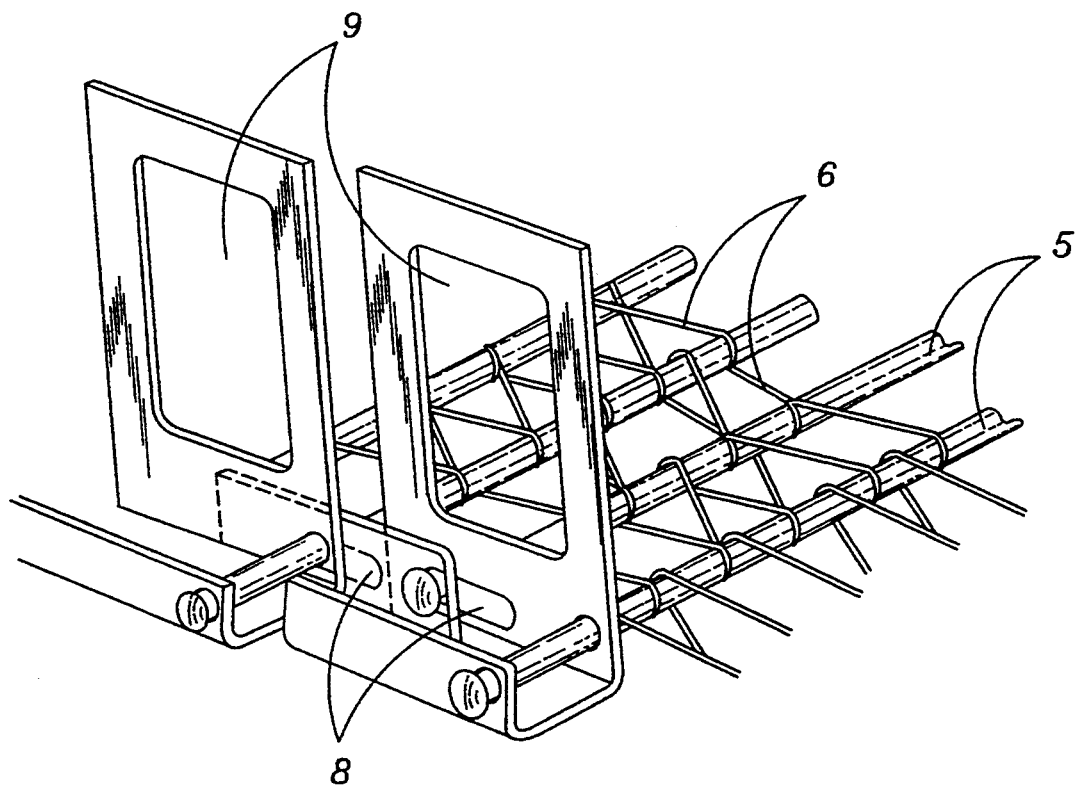
Figure 10:
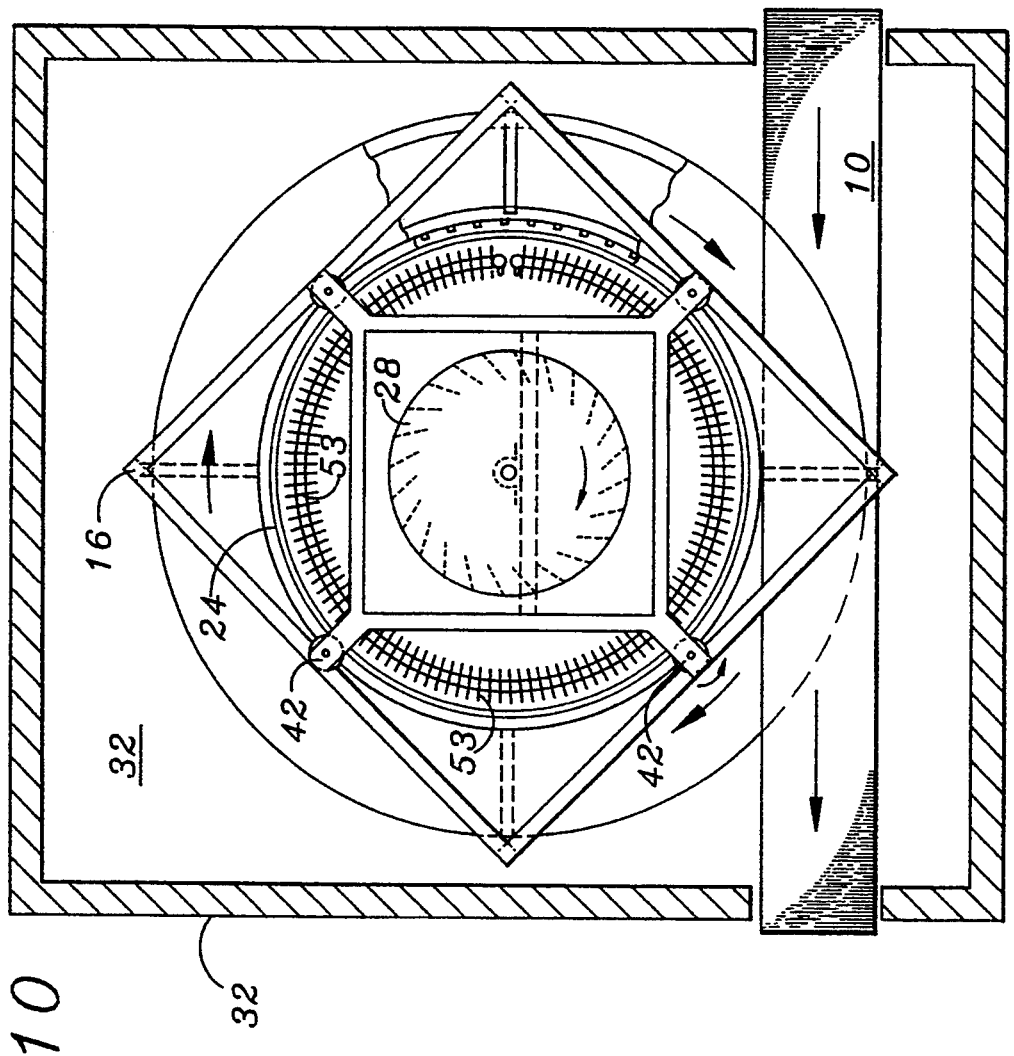
FIG. 10 shows a top sectional view of the present invention with a heating means.

Such a self-supporting conveyor 50 is known in the related art through U.S. Pat. No. 3,938,651 issued to Alfred et al. on Feb. 17, 1976. However, when used in the present invention, such a self-supporting conveyor would require foramenous side links and supports 52 so that the air could continue to flow over the conveyed objects 12 in the toroidal manner previously described above. FIGS. 9A and 9B shows such an end link.

While the present invention has been described with regards to particular embodiments, it is recognized that additional variations of the present invention may be devised without departing from the inventive concept. One such variation is the use of the present invention for treatment of helically conveyed articles by means other than refrigeration. One such variation is the use of a heater 53 instead of a refrigeration coil to heat the air within the enclosed chamber 32. Heater 53 is well known in the art and can be of any type capable of heating air. Likewise, instead of facing outward, the fans 28, 30 of the present invention may face inward to accomplish basically the same air-flow effect. The articles may travel in a helically downward manner rather than a helically upward manner, and the refrigeration coils that chill the air may be placed other than in the carousel 16 interior.

What is claimed is:

1. A refrigerator for the uniform chilling of articles, comprising:
   insulated walls defining an insulated enclosure;
   an endless conveyor belt encompassed by said insulated enclosure;
   a carousel supporting and impelling said endless conveyor;
   a frame supporting said carousel and upon which said carousel turns, said frame having a top, and a bottom, and defining interior and exterior spaces;
   a first fan attached to said top of said frame, said first fan evacuating air from said interior space of said frame to space exterior to said frame;
   a second fan attached to said bottom of said frame, said second fan evacuating air from said interior space of said frame to space exterior to said frame; and
   a refrigeration unit having refrigeration coils within said interior space of said frame, said refrigeration coils being coaxial with said first and second fans and centrally placed between said first and second fans; whereby
   air refrigerated by said refrigeration coils is drawn from said interior of said frame and circulated by both said first and said second fans so that refrigerated air is drawn across said refrigeration coils and said endless conveyor belt, and any articles thereon, in a manner generally perpendicular to the direction of travel of said endless conveyor belt.

2. The refrigerator of claim 1, wherein said refrigeration unit further comprises generally circular coil construction.

3. The refrigerator of claim 1, wherein said refrigeration unit further comprises generally triangular coil construction.

4. The refrigerator of claim 1, wherein said refrigeration unit further comprises generally square coil construction.

5. The refrigerator of claim 1, wherein said refrigeration unit further comprises generally oval coil construction.

6. The refrigerator of claim 1, wherein said refrigeration unit further comprises generally hexagonal coil construction.

7. The refrigerator of claim 1, wherein said refrigerator further comprises:
   first and second baffles, said first to second baffles respectively surrounding said first and second fans whereby air propelled by said fans is directed towards edges of said carousel.

8. The refrigerator of claim 1, wherein said endless conveyor belt is self-supporting.

9. The refrigerator of claim 8, wherein said self-supporting, endless conveyor belt permits air to be drawn across articles suspended thereon.

* * * * *